United States Patent [19]
Balloni et al.

[11] Patent Number: 4,659,612
[45] Date of Patent: Apr. 21, 1987

[54] POLYMER FILM LAMINATE AND METHOD FOR ITS PREPARATION

[75] Inventors: Ricardo Balloni, Fairport, N.Y.; Kevin M. Donovan, Milford, Conn.; Jay K. Keung, Macedon, N.Y.

[73] Assignee: Mobil Oil Corporation, New York, N.Y.

[21] Appl. No.: 829,051

[22] Filed: Feb. 13, 1986

[51] Int. Cl.[4] .............................................. B32B 7/02
[52] U.S. Cl. .................................. 428/213; 428/516; 428/349
[58] Field of Search ................ 428/516, 349, 213, 212

[56] References Cited

U.S. PATENT DOCUMENTS

| | | |
|---|---|---|
| 3,176,021 | 3/1965 | Volungis et al. . |
| 3,399,156 | 8/1968 | Bell . |
| 4,117,193 | 9/1978 | Tsuchiya et al. . |
| 4,294,882 | 10/1981 | Andrews et al. ..................... 428/349 |
| 4,343,852 | 8/1982 | Isaka et al. . |
| 4,348,457 | 9/1982 | Rosenthal et al. ................... 428/349 |
| 4,400,428 | 8/1983 | Rosenthal et al. . |
| 4,419,410 | 12/1983 | Weiner ................................ 428/349 |
| 4,419,411 | 12/1983 | Park . |
| 4,438,176 | 3/1984 | Steiner et al. ........................ 428/349 |
| 4,502,263 | 5/1985 | Crass et al. . |
| 4,590,125 | 5/1986 | Balloni et al. ....................... 428/349 |
| 4,604,324 | 8/1986 | Nahmias ............................. 428/349 |

Primary Examiner—Edith Buffalow
Attorney, Agent, or Firm—Alexander J. McKillop; Michael G. Gilman; Charles J. Speciale

[57] ABSTRACT

An oriented, polymer film laminate possessing a low coefficient of friction, good receptivity for water-based coatings and good optical clarity and a method for manufacturing such a laminate are provided.

15 Claims, No Drawings

POLYMER FILM LAMINATE AND METHOD FOR ITS PREPARATION

BACKGROUND OF THE INVENTION

This invention relates to the field of polymer film laminates and methods for forming such films, and in particular, to a coextruded oriented film laminate possessing an isotactic polypropylene core layer faced on its upper side with an isotactic polypropylene layer containing an anti-blocking agent and a silicone oil and faced on its lower side with an isotactic polypropylene layer containing an anti-blocking agent and, optionally, a silicone oil.

Multilayer films which are especially useful as packaging materials are well know in the art.

U.S. Pat. No. 4,343,852 describes a uniaxially or biaxially stretched composite film packaging material of from 5 to 200 microns total thickness possessing a propylene polymer base film and at least one surface film containing at least two of (a) an ethylene-propylene (EP) copolymer, (b) a propylene-alpha-olefin copolymer and (c) a copolymer of butene and any other alpha-olefin. The propylene polymer base film can contain any one of a variety of additives, e.g., a lubricating agent such as a fatty acid amide, and each surface film can contain from 0.01 to 0.15 parts by weight of a silicone oil to improve its coefficient of friction in the heated state and reduce its slide resistance caused during hot plate seal by an automatic packaging machine. Examples of silicone oils which are said to be useful for this purpose are polydimethylsiloxane, polymethylphenylsiloxane, olefin-modified silicone, polyether (e.g. polyethylene glycol, polypropylene glycol)-modified silicone, olefin/polyether-modified silicone, epoxy-modified silicone, etc.

U.S. Pat. No. 4,400,428 describes a heat sealable, multilayer film packaging material possessing a biaxially stretched polypropylene film as the base film, an adhesion-promoting layer of modified polyolefins, a gas-barrier layer of hydrolyzed ethylene-vinyl acetate copolymer and a heat-sealing layer of olefin polymers, wherein the base film carries on at least one surface an optionally at least monoaxially oriented layer combination consisting of: (A) a heat sealable outer layer of polyethylene or of an ethylene copolymer containing at least 3%, and preferably at least 4%, by weight of ethylene; (b) an adhesion-promoting layer of modified polyolefin; (c) a gas-barrier layer of a hydrolyzed ethylene/vinyl acetate copolymer containing from 50 to 80 mole percent of vinyl acetate units of which at least 90% by hydrolyzed; (d) an adhesion-promoting layer of modified polyolefin; and, (e) a layer of polyethylene or of an ethylene copolymer containing at least 3, preferably at least 4% by weight of ethylene. Layer (a) contains an additive combination consisting of: (1) from 0.3 to 1% by weight, based on the sealable layer, of a long-chain aliphatic amine; (2) from 0.1 to 0.7% by weight, based on the sealable layer, of a dispersed thermoplastic polymer which is incompatible with the polyethylene or ethylene copolymer and which has a softening point at most 50° C. below or above the softening point of the polyethylene or ethylene copolymer; and, (3) from 0.1 to 1.2% by weight, preferably 0.2–0.7, based on the sealable layer, of a polydialkylsiloxane, preferably polydimethylsiloxane. The foregoing additive combination is said to produce a multilayer film having very good slipping properties combined with good machine processibility compared to known multilayer films containing known type lubricants such as the fatty acid amides, e.g., erucamide.

U.S. Pat. No. 4,419,411 describes an oriented multilayer polypropylene film structure comprising coextended layers of: (a) a base layer comprising polypropylene of comparatively high stereoregularity, the precursor resin of which contains an amide of a water-insoluble monocarboxylic acid having about 8 to about 24 carbon atoms, e.g., erucamide; (b) a skin layer comprising a polyolefin of comparatively low stereoregularity on at least one surface of (a), said skin layer containing a surface-modifying proportion of a combination of finely divided silica and a silicone oil such as a 30,000 centistokes polydimethylsiloxane; the surface of skin layer (b) having bloomed thereon a surface-modifying proportion of at least some of the amide of base layer (a).

U.S. Pat. No. 4,502,263 describes a heat sealable polyolefinic multilayer film possessing a base layer comprise of a propylene polymer and at least one sealable layer containing at least one propylene copolymer, at least one low-molecular weight resin and at least one polydiorgano-siloxane, wherein the sealing layer comprises a combination of: (a) from about 68.5 to 89.7% by weight, base on the weight of the sealable layer, of an olefin resin composition comprising an ethylene-propylene-butylene terpolymer and a propylene-butylene copolymer, corresponding to a content of from about 0.1 to 7% by weight of ethylene, 53 to 89.9% by weight of propylene and 10 to 40% by weight of butylene, based on the weight of the olefin resin composition; (b) from about 5 to 15% by weight, based on the weight of the sealable layer, of a low-molecular weight resin, which is compatible with the olefin resin composition; (c) from about 5 to 15% by weight, based on the weight of the sealable layer, of a propylene homopolymer; and (d) from about 0.3 to 1.5% by weight, based on the weight of the sealable layer, of a polydiorganosiloxane such as any of those referred to above.

SUMMARY OF THE INVENTION

In accordance with the present invention, there is provided an oriented, polymer film laminate possessing a low coefficient of friction, good receptivity for water-based coatings and good optical clarity which comprises:

(a) an upper layer coextensively adherent to the upper surface of a core layer (b), said upper layer (a) being derived from an isotactic polypropylene polymer containing an anti-blocking effective amount of anti-blocking agent and a coefficient of friction-reducing amount of silicone oil;

(b) a core layer derived from an isotactic polypropylene; and, (c) a lower layer coextensively adherent to the lower surface of core layer (b), said lower layer (c) being derived from an isotactic polypropylene polymer containing an anti-blocking effective amount of anti-blocking agent, said layers (a), (b) and (c) each being essentially devoid of any substance which would appreciably reduce the receptivity of the exposed surfaces of layers (a) and (c) to water-based coatings.

The term "water-based coating" is to be understood in its broadest sense and includes water-based inks and water-based adhesives.

Unlike the prior art composite films which may contain a fatty acid amide such as erucamide, stearamide, behenamide, oleamide, etc., to impart lubricity or slip to the films, e.g., the multilayer films described in U.S. Pat. Nos. 4,343,852 and 4,419,411, supra, the film of this invention does not contain such an ingredient since it usually interferes with the receptivity of the film surface for, and the adhesion of, water-based inks and water-based adhesives. Moreover, when concentrated at the film surface, a fatty acid amide can appreciably reduce the optical clarity of the film.

A polymer film laminate possessing both low coefficient of friction, good receptivity for water-based surface coating materials and good optical clarity such as the film of the present invention is highly advantageous since it permits the convertor/end user to utilize inks and/or adhesives which do not incorporate organic solvents. Organic solvents generally present health, explosion and fire hazards and resort must be had to expensive ventilation and safely equipment to provide an acceptable working environment where they are used. Even with the use of such equipment, in some jurisdictions, the atmospheric emission of organic solvents is prohibited and expensive solvent recovery systems are required to comply with legal limitations. The films herein avoid organic solvent-containing coating materials thereby eliminating the health, safety and environmental problems attendant their use as well as the cost of the equipment required to deal with the hazards which they pose.

DESCRIPTION OF THE PREFERRED EMBODIMENTS

All three layers of the polymer film laminate herein are derived from polypropylenes of high stereoregularity and in general will be chosen from among the highly isotactic polypropylenes. The layers can be prepared from the identical isotactic polypropylene or from two or three varieties thereof. The preferred polypropylenes are well known in the art and are formed by polymerizing polypropylene in the presence of stereospecific catalyst systems. The polypropylenes can have a melt index at 230° C. ranging from about 1.0 to about 25.0. The crystalline melting point is about 160° C. The number average molecular weight ranges from about 25,000–100,000 and density ranges from about 0.90 to 0.91.

Prior to extrusion, upper layer (a) is compounded with an anti-blocking effective amount of an anti-blocking agent, e.g., silica, silicate, clays, talc, glass and the like, which are preferably provided in the form of approximately spheroidal particles. Syloid 244 (W. R. Grace & Co., Davison Chemical Division), a synthetic silica, and Sipernat 44 (Degussa), a synthetic silicate generally provide good results. The major proportion of these particles, for example, anywhere from more than half to as high as 90 weight percent or more, will be of such a size that a significant portion of their surface area for example, from about 10 to about 70 percent thereof, will extend beyond the exposed surface of layer (a).

The isotactic polypropylene from which upper layer (a) is formed is further compounded with a coefficient of friction-reducing amount of silicone oil. The silicone oil advantageously possesses a viscosity of from about 350 to about 2,500,000 centistokes with 10,000 to about 30,000 centistokes being especially preferred. Examples of suitable silicone oils are polydialkylsiloxanes, polyalkylphenylsiloxanes, olefin-modified siloxane oils, polyether-modified silicone oils, olefin/-polyether-modified silicone oils, epoxy-modified silicone oils and alcohol-modified silicone oils, polydialkyl-siloxanes which preferably have from about 1 to about 4 carbon atoms in the alkyl group, in particular polydimethylsiloxanes. Of the foregoing, the polydialkylsiloxanes, in particular, a polydimethylsiloxane, are preferred for use herein.

The silicone oil is added to the polymer of upper layer (a) generally in the form of a dispersion or emulsion, the silicone being present within, as well as on the exposed surface of, this layer as discrete microglobules, frequently of an average size of from about 1 to about 2 microns. The silicone oil, which is generally substantially uniformly distributed on the exposed surface of upper layer (a), is responsible for imparting a reduced coefficient of friction to this surface as well as to the exposed surface of lower layer (c) when some of the oil is transferred thereto after these surfaces have been placed in mutual contact, e.g., as will occur when the laminate film has been wound on a winding coil.

Polydimethylsiloxane or other silicone oil can be present at from about 0.15 to about 1.5 weight percent of upper layer (a). Some of this silicone oil will, of course, be present on the exposed surface of layer (a). The amount selected should in any event be sufficient to provide a coefficient of friction of layers (a) and (c) (following transfer of silicone oil microglobules to the latter) of about 0.4 or less, preferably between about 0.25 to about 0.3, up to at least about 60° C. Because of the unique manner in which the silicone oil is applied to just the exposed surface of lower layer (c), such layer exhibits an improved coefficient of friction but not at the expense of its receptivity to water-based coatings or its optical clarity.

The silicone oil should be incorporated as homogeneously as possible in the isotactic polypropylene constituting upper layer (a). This can be achieved by either incorporating the silicone oil as a dispersion or emulsion at room temperature and then heating the blend with the application of shearing forces or by incorporating the oil while the blend is being melted. The mixing temperature must be high enough to soften the blend and enable a very uniform mixture to be formed. The temperature required in a kneader or extruder is generally from about 170° to about 270° C.

Lower layer (c), prior to extrusion, is compounded with an anti-blocking effective amount of an anti-blocking agent in the same manner as in upper layer (a). In addition, a coefficient of friction-reducing amount of a silicone oil can optionally be incorporated in lower layer (c) just as in upper layer (a). In yet other embodiments of the polymer film laminate herein, layers (a) and/or (c) can optionally contain a minor amount of a wax, e.g., a microcrystalline wax for added lubricity. Amounts of wax of from about 2 to about 15 weight percent of either or both layers (a) and (c) can be used if desired. Either or both of these layers, including core layer (b), can also contain pigments, fillers, stabilizers, light protective agents, anti-static agents or other suitable modifying ingredients if desired In order to enhance receptivity for water-based coatings, the exposed surface of layers (a) and/or (c) can be treated by such known and conventional techniques such as corona discharge and flame treating The treated surface or surfaces show excellent water based coatings wet-out and adhesion.

Core layer (b) will usually represent from about 70 to about 90 percent of the thickness of the overall film laminate or an even higher percentage thereof. Upper surface layer (a) and lower surface layer (c) are coextensively applied to each major surface of core layer (b), usually by being coextruded directly thereon. For example, the individual isotactic polypropylene streams to be formed into layers (a), (b) and (c) can be coextruded from a conventional extruder through a flat sheet die, the melt streams being combined in an adapter prior to being extruded from the die. Each of surface layers (a) and (c) can comprise, for example, approximately 6.0% of the total thickness of the laminate. The overall thickness of the laminate is not critical and advantageously can range from about 0.35 to about 2.0 mils. After leaving the die orifice, the laminate structure is chilled and the quenched sheet then heated and stretched, e.g., five times in the machine direction (MD) and then subsequently, for example, eight times in the transverse direction (TD). The edges of the film can be trimmed. The film laminate is then wound on a reel in order to effect transfer of silicone oil from the exposed surface of layer (a) to the exposed surface of layer (c) as previously explained.

The following examples are illustrative of the method of the process herewith for imparting a polymer film laminate and method for its preparation.

EXAMPLE 1: Comparative Example

Upper and lower layers (a) and (c) each of about .6 microns in thickness, and core layer (b) of about 20 microns thickness, all of which were derived from the same isotactic polypropylene (Shell DX5097) were coextruded to provide a film laminate. The polypropylene constituting upper and lower layers (a) and (c) contained 0.2 weight percent of synthetic anti-block agent. The polypropylene constituting core layer (b) contained 2000 ppm erucamide. The extruded laminate was cooled by quenching, reheated and stretched biaxially 4-6 times in the machine direction at about 290° F. and 8-10 times in the transverse direction at about 330° F. Subsequently, the exposed surfaces of upper layer (a) and lower layer (c) were corona treated in a conventional manner to 38 dynes/cm and wound in a mill roll form. After 3 days of hot room aging at 125° F., the coefficients of friction of layers (a) and (c) were excellent but receptivity for water based coatings was poor.

Synthetic silicate or silica could be used as anti-block agents, e.g. Sipernat 44 is synthetic silicate and Syloid 244 is synthetic silica.

EXAMPLE 2

Example 1 was substantially repeated but with core layer (b) containing no erucamide. Polydimethylsiloxane, 30,000 centistokes was compounded into the anti-block containing layers (a) and (c). The coefficients of friction of layers (a) and (c) were excellent but unlike the film laminate of Example 1, the receptivity of said layers for water base coatings was good.

EXAMPLE 3

Example 2 was substantially repeated but omitting polydimethylsiloxane from lower layer (c). As a result of being wound in the mill roll form, some polydimethylsiloxane transferred from the exposed surface of upper layer (a) of one section of the laminate to the exposed surface of lower layer (c) of another section of the laminate. In this manner, even though layer (c) originally did not contain polydimethyl-siloxane, it subsequently received a sufficient amount of this material from layer (a) as to exhibit, along with layer (a), an acceptably low coefficient of friction. In addition, the receptivity of layers (a) and (c) for water base coatings was as good as in the film laminate of Example 2.

The data for Examples 1 to 3 is summarized in the following table:

TABLE

Coefficient of Friction and Receptivity of Water Based Coatings of Film Laminates

| | Upper Layer (a) | Core Layer (b) | Lower Layer (c) | Coefficient of Friction Upper Layer (a) | Coefficient of Friction Lower Layer (c) | Receptivity of layers (a) and (c) For Water-Based Coatings |
|---|---|---|---|---|---|---|
| Example 1 (comparative) | anti-block agent | erucamide | anti-block agent | .25 | .18 | Poor wet-out and adhesion |
| Example 2 | anti-block agent + silicone oil | — | anti-block agent + silicone oil | .22 | .22 | Good wet-out and adhesion |
| Example 3 | anti-block agent + silicone oil | — | anti-block agent only | .23 | .25 | Good wet-out and adhesion |

What is claimed is:

1. A polymer film laminate possessing a low coefficient of friction, good receptivity for water-based coatings and good optical clarity which comprises:
   (a) an upper layer coextensively adherent to the upper surface of a core layer (b), said upper layer (a) being derived from an isotactic polypropylene polymer containing an anti-blocking effective amount of anti-blocking agent and a coefficient of friction-reducing amount of silicone oil;
   (b) a core layer derived from an isotactic polypropylene; and,
   (c) a lower layer coextensively adherent to the lower surface of core layer (b), said lower layer (c) being derived from an isotactic polypropylene polymer containing an anti-blocking effective amount of anti-blocking agent,
   said layers (a), (b) and (c) each being essentially devoid of any substance which would appreciably reduce the receptivity of the exposed surfaces of layers (a) and (c) to water-based coatings.

2. The laminate of claim 1 containing a wax in layer (a) and/or (c).

3. The laminate of claim 1 containing a microcrystalline wax in layer (a) and/or (c).

4. The laminate of claim 1 in which the exposed surface of layer (a) and/or (c) is subjected to corona discharge or flame treating.

5. The laminate of claim 1 in which the silicone oil is a polydialkylsiloxane.

6. The laminate of claim 1 in which the silicone oil is a polydimethylsiloxane.

7. The laminate of claim 1 in which a sufficient amount of silicone oil is incorporated in layer (a) as to confer upon the exposed surfaces of layers (a) and (c), following their mutual contact, a coefficient of friction of less than about 0.4 up to at least about 60° C.

8. The laminate of claim 1 in which a sufficient amount of silicone oil is incorporated in layer (a) as to confer upon the exposed surfaces of layers (a) and (c), following their mutual contact, a coefficient of friction of from about 0.25 to about 0.3 up to at least about 60° C.

9. The laminate of claim 1 in which at least a major proportion of the anti-blocking agent is in the form of particles of approximately spherical shape.

10. The laminate of claim 1 in which the anti-blocking agent is silica or silicate.

11. The laminate of claim 1 in which the anti-blocking agent is silica particles at least a major proportion of which are approximately spherical in shape.

12. The laminate of claim 1 in which from about 10 to about 70 percent of the total surface area of the anti-blocking agent extends beyond the exposed surface of layers (a) and (c).

13. The laminate of claim 1 in which the isotactic polypropylene constituting each of layers (a), (b) and (c) possesses a melt index at 230° C. of from about 1.0 to about 25.0, a crystalline melting point of about 160° C., a number average molecular weight range of from about 25,000 to about 100,000 and a density of from about 0.90 to about 0.91.

14. The laminate of claim 1 in which layer (b) constitutes at least about 70 percent of the total thickness of the laminate with the balance of the thickness of the laminate being distributed among layers (a) and (c).

15. The laminate of claim 14 in which the total thickness of the laminate is from about 0.35 to about 2.0 mils.

* * * * *